US007345240B2

(12) United States Patent
Montena

(10) Patent No.: US 7,345,240 B2
(45) Date of Patent: Mar. 18, 2008

(54) TAMPER RESISTANT ELECTRICAL GROUND BLOCK

(75) Inventor: Noah Montena, Syracuse, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 0 days.

(21) Appl. No.: 11/423,564

(22) Filed: Jun. 12, 2006

(65) Prior Publication Data

US 2007/0284129 A1 Dec. 13, 2007

(51) Int. Cl.
*H02G 15/02* (2006.01)

(52) U.S. Cl. ...................................... 174/74 R; 174/78

(58) Field of Classification Search .............. 174/74 R, 174/75 R, 75 C, 78, 84 R, 88 C, 94 S; 439/95, 439/96, 97, 92

See application file for complete search history.

(56) References Cited

U.S. PATENT DOCUMENTS

| | | | | |
|---|---|---|---|---|
| 5,632,633 | A * | 5/1997 | Roosdorp et al. | 439/100 |
| 6,011,218 | A * | 1/2000 | Burek et al. | 174/40 CC |
| 6,194,661 | B1 * | 2/2001 | Gretz | 174/650 |
| 6,877,996 | B1 * | 4/2005 | Franks, Jr. | 439/92 |
| 6,976,857 | B1 * | 12/2005 | Shukla et al. | 439/100 |
| 6,986,673 | B2 * | 1/2006 | de la Borbolla | 439/100 |
| 7,198,495 | B1 * | 4/2007 | Youtsey | 439/97 |

* cited by examiner

*Primary Examiner*—William H. Mayo, III
(74) *Attorney, Agent, or Firm*—Christopher R. Pastel; Pastel Law Firm

(57) ABSTRACT

A tamper-resistant electrical ground block includes a ground block chassis that is looped over a port structure so that an installer has to use a security-type wrench to tighten or loosen coaxial cable connectors from the port structure. A ground clamp, one-piece with the chassis, accommodates a wide range of ground wire sizes.

15 Claims, 6 Drawing Sheets

TAMPER RESISTANT ELECTRICAL GROUND BLOCK

FIELD OF THE INVENTION

This invention relates generally to the field of electrical ground blocks, and more particularly to a tamper-resistant electrical ground block for coaxial cable connectors.

BACKGROUND OF THE INVENTION

Ground blocks are used in virtually every household coaxial cable installation, whether from cable or satellite, both as a convenient connection point outside the house and as a bonding point to the electrical ground. The open design of current ground blocks, while convenient to use and cheap in materials, promotes finger tightening of connectors on to the port terminals, and requires the use of extra security shields if tamper resistance is required. As a result, the most important connection in the house is often loose and susceptible to moisture, radio frequency leaking, and tampering.

SUMMARY OF THE INVENTION

Briefly stated, a tamper-resistant electrical ground block includes a ground block chassis that is looped over a port structure so that an installer has to use a security-type wrench to tighten or loosen coaxial cable connectors from the port structure. A ground clamp, one-piece with the chassis, accommodates a wide range of ground wire sizes.

According to an embodiment of the invention, a tamper-resistant electrical ground block includes a ground block chassis; a support connected to the chassis; a ground clamp connected to the chassis; and a port structure connected to the support; wherein the chassis is looped over the port structure such that a security wrench is required to tighten a coaxial cable connector onto the port structure.

According to an embodiment of the invention, a tamper-resistant electrical ground block includes a ground block chassis; support means for supporting a port structure within the chassis; a ground clamp connected to the chassis; and prevention means for preventing a coaxial cable connector from being tightened onto the port structure without the aid of a security wrench.

According to an embodiment of the invention, a method for manufacturing a tamper-resistant electrical ground block includes the steps of (a) providing a workpiece of a conductive material; (b) forming a plurality of screw holes in the workpiece and a corresponding plurality of screw access holes in the workpiece; (c) forming a plurality of access holes in the workpiece to accommodate a corresponding plurality of coaxial cable connectors; (d) forming a support from a first portion of the worlkpiece; (e) forming a ground clamp from a second portion of the workpiece; (f) press-fitting a port structure into the support, wherein the port structure includes a plurality of threaded sections for connecting the plurality of coaxial cable connectors onto the port structure; and (g) looping the workpiece around the port structure such that a security wrench is required to tighten the plurality of coaxial cable connectors onto the plurality of threaded sections of the port structure.

DETAILED DESCRIPTION OF THE PREFERRED EMBODIMENT

Figure 1:
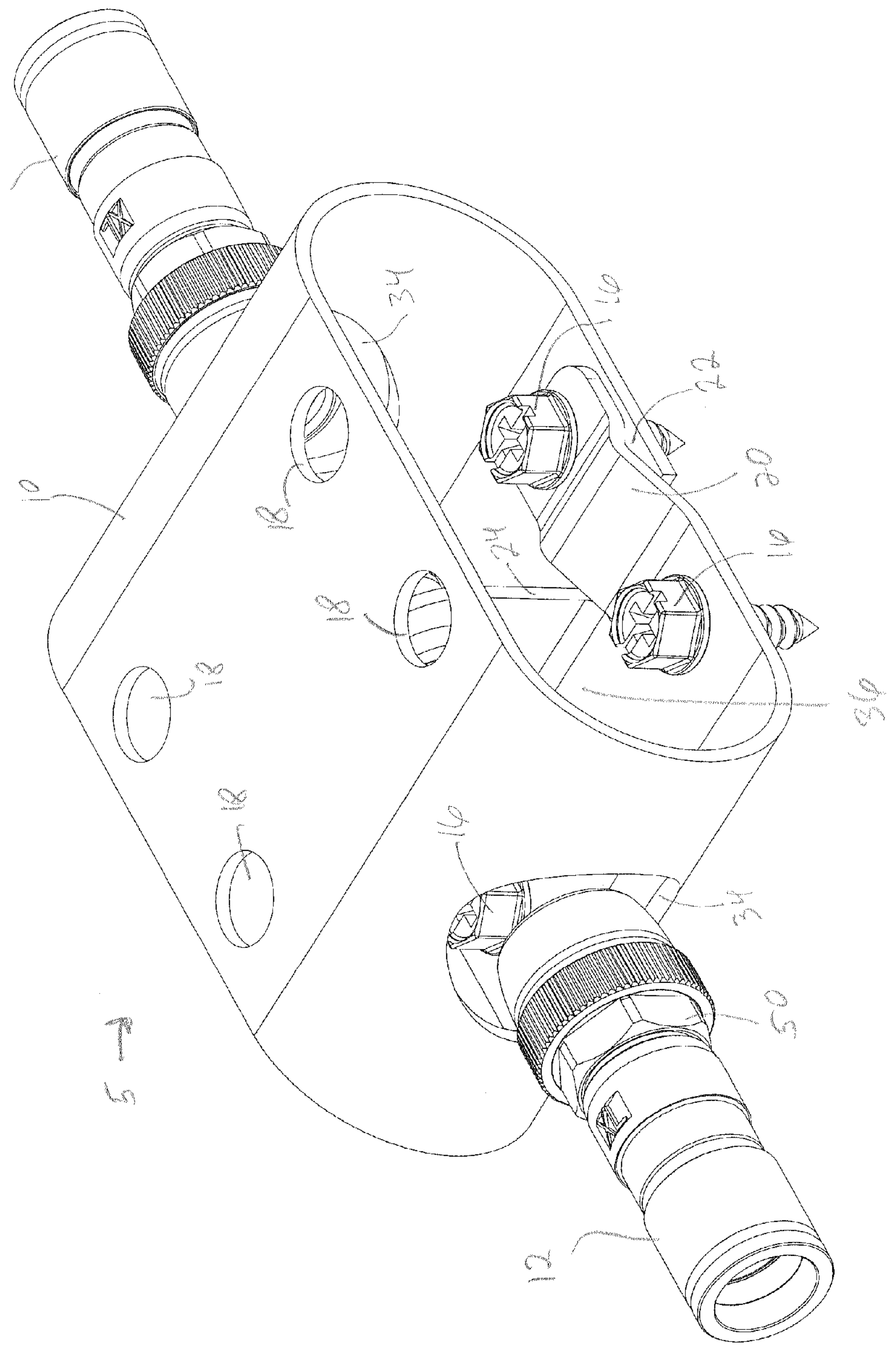
FIG. 1 shows a perspective view of an electrical ground block according to an embodiment of the invention.

Referring to FIG. 1, a tamper resistant electrical ground block 5 is shown. A ground block chassis 10 is preferably made of stainless steel, while nickel-plated brass would also work but be subject to being damaged by scratching during installation. Chassis 10 is preferably formed from a single piece of material, with a support 24 and a ground clamp 20 formed by cutting the material between these two parts. A concavity 22 is formed in ground clamp 20, while support 24 is bent orthogonal to a portion 36 of chassis 10. A plurality of access holes 18 are formed in chassis 10, as are a plurality of holes 34. Chassis 10 is then bent into the shape shown so that a plurality of screws 16 are accessible through access holes 18 and connectors 12 fit through holes 34. Screws 16 are preferably of the same material as chassis 10, which in this case is preferably stainless steel, to prevent corrosion from using dissimilar metals. One screw 16 secures a ground wire in ground clamp 20 when fully tightened.

Figure 2:
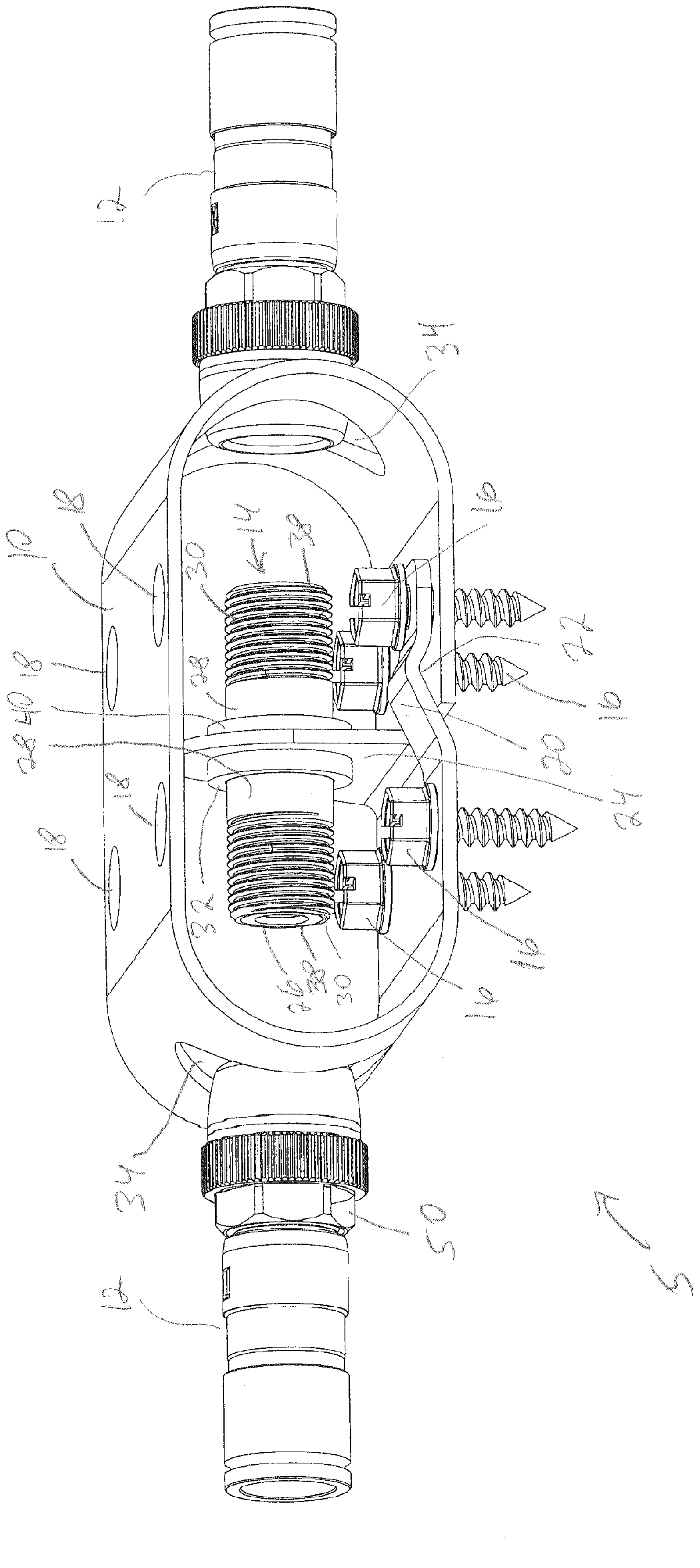
FIG. 2 shows a perspective view of an electrical ground block according to an embodiment of the invention.
Figure 3:
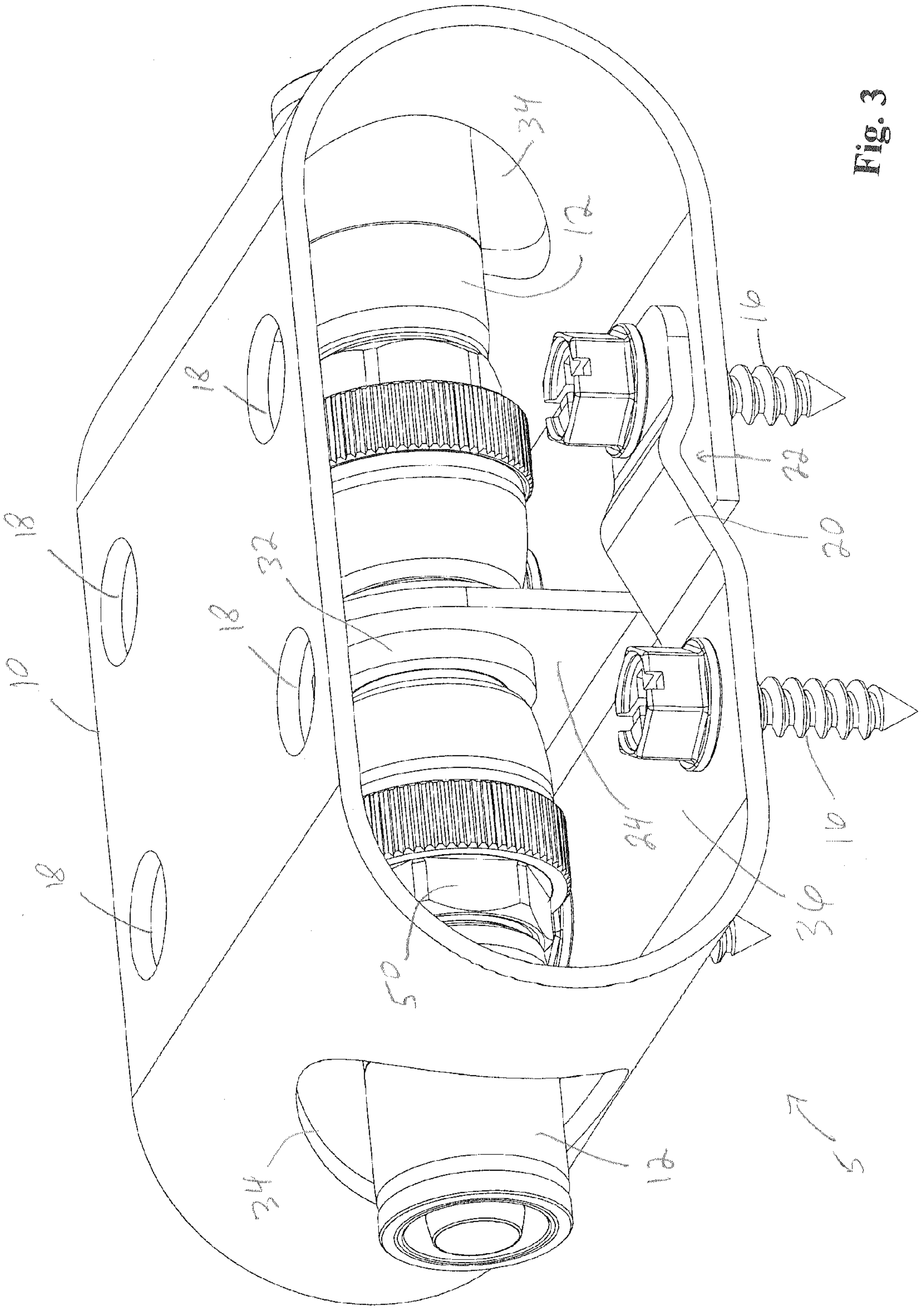
FIG. 3 shows a perspective view of an electrical ground block according to an embodiment of the invention.
Figure 4:
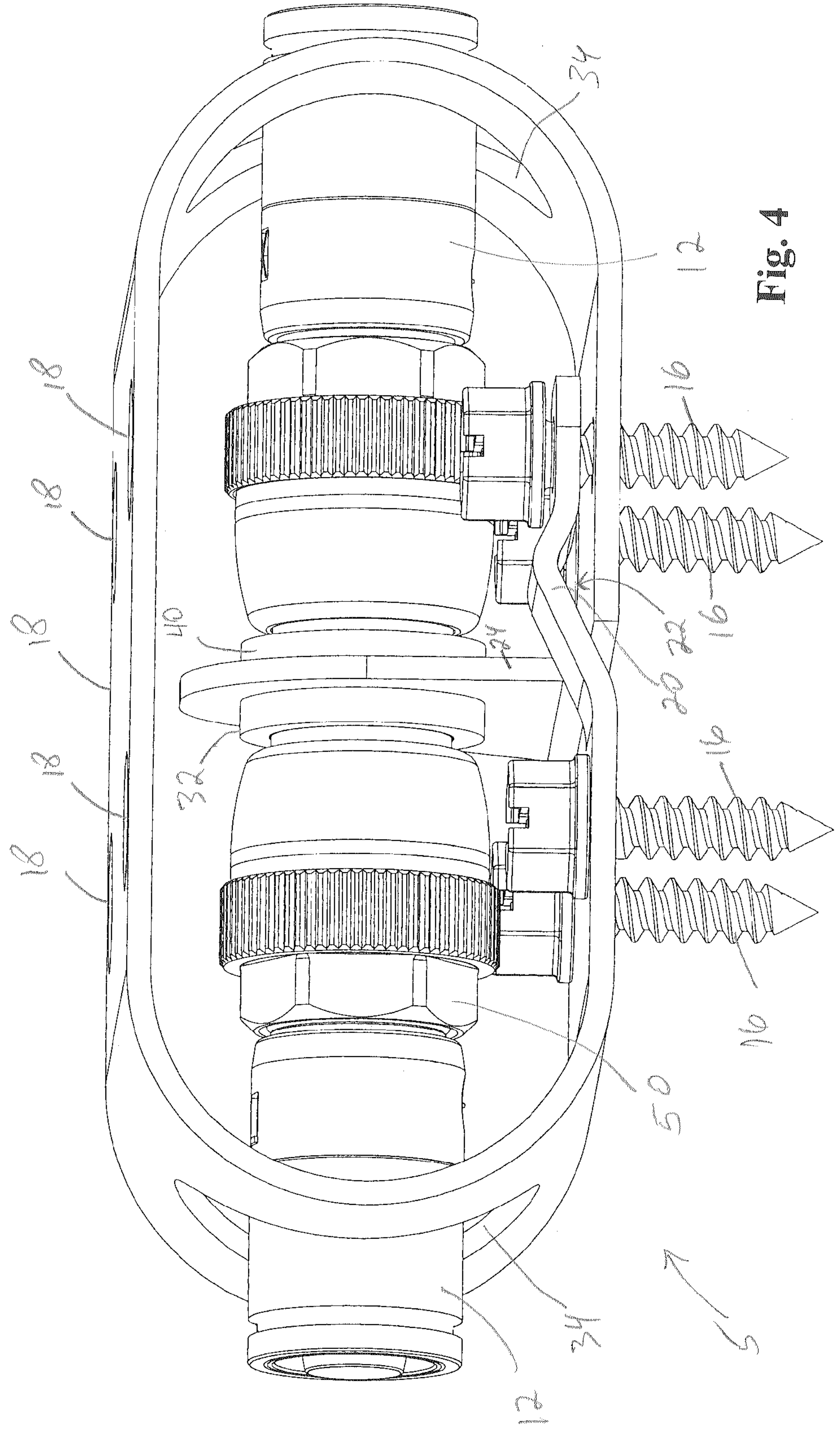
FIG. 4 shows a perspective view of an electrical ground block according to an embodiment of the invention.

Referring to FIGS. 2-4, a hole (not shown) in support 24 permits port structure 14 to be attached to support 24. Port structure 24 includes a barrel 26 which contains two ports 38, each port 38 including a smooth section 28 to cooperate with seals such as O-rings (not shown) and a threaded length 30. Barrel 26 preferably includes a flange 40 and is preferably press-fitted into the hole (not shown) in support 24 with a ring 32. A key tab cut (not shown) on the hole (not shown) optionally prevents rotation of barrel 26 of port structure 24. Barrel 26 is preferably of nickel-plated brass. Connectors 12 screw onto threaded lengths 30 of barrel 26. Ground clamp 20 can accommodate a wide range of wire sizes, with the only disadvantage being that the ground wire can enter ground block 5 from only one direction.

By looping ground block chassis 10 around both connectors 12, the present invention creates a shroud which both limits access by unauthorized fingers and forces an installer to use a security wrench 42 (FIG. 5) to interoperate with a wrench head 50 of connector 12 to tighten connectors 12 onto threaded lengths 30. The looped design is also straightforward to form from a sheet-metal part, requiring only basic punch and form tooling with no welds.

Figure 5:
FIG. 5 shows a security wrench used with the connector of the present invention.
Figure 6:
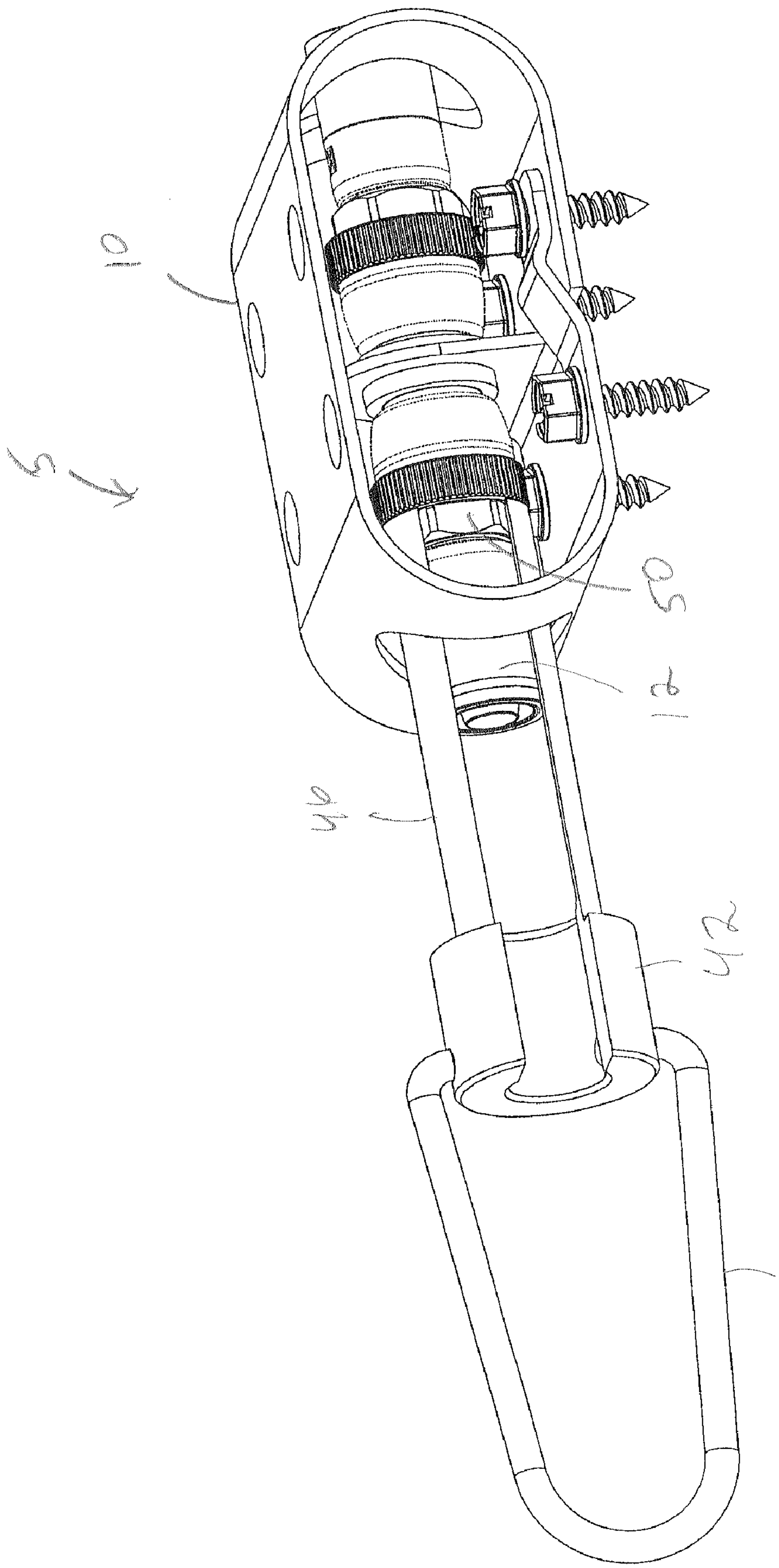
FIG. 6 shows the security wrench of FIG. 5 fully engaged with the connector of the present invention.

Referring to FIGS. 5-6, security wrench 42 is shown as it is aligned with connector 12 through hole 34 in ground block chassis 10 of ground block 5. Security wrench 42 preferably includes a ring 44 rotatably affixed to a body 46. A plurality of recesses 48 interoperate with wrench head 50 of connector 12. FIG. 6 shows security wrench 42 fully engaged with connector 12. Security wrench 42 is essentially a deep-well socket with recesses cut into the inside cylinder. The specific shape of the wrench is unimportant except that it has to be able to engage the connector wrench head, which although traditionally hexagonal in shape, can be any effective shape. The shape of ground block 5 is thus effective for requiring security wrench 42 to either tighten or loosen connector 12.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A tamper-resistant electrical ground block, comprising:

a ground block chassis;

a support connected to the chassis;

a ground clamp connected to the chassis; and a port structure connected to the support;

wherein the chassis is looped over the port structure such that a security wrench is required to tighten a coaxial cable connector onto the port structure.

2. A ground block according to claim 1, wherein the chassis, support, and ground clamp are all one-piece.

3. A ground block according to claim 2, wherein the chassis of stainless steel.

4. A ground block according to claim 1, wherein the chassis includes two holes which permit first and second coaxial cable connectors to access the port structure.

5. A ground block according to claim 1, wherein the ground clamp accepts a range of ground wire sizes.

6. A ground block according to claim 1, further comprising a plurality of screws which enable fastening the ground block onto a structure, one of which screws secures a ground wire in the ground clamp.

7. A tamper-resistant electrical ground block, comprising:

a ground block chassis;

support means for supporting a port structure within the chassis;

a ground clamp connected to the chassis; and prevention means for preventing a coaxial cable connector from being tightened onto the port structure without the aid of a security wrench.

8. A ground block according to claim 1, wherein the chassis, support means, and ground clamp are all one-piece.

9. A ground block according to claim 8, wherein the chassis of stainless steel.

10. A ground block according to claim 7, wherein the chassis includes two holes which permit first and second coaxial cable connectors to access the port structure.

11. A ground block according to claim 7, wherein the ground clamp accepts a range of ground wire sizes.

12. A ground block according to claim 7, further comprising a plurality of screws which enable fastening the ground block onto a structure, one of which screws secures a ground wire in the ground clamp.

13. A method for manufacturing a tamper-resistant electrical ground block, comprising the steps of:

providing a workpiece of a conductive material;

forming a plurality of screw holes in the workpiece and a corresponding plurality of screw access holes in the workpiece;

forming a plurality of access holes in the workpiece to accommodate a corresponding plurality of coaxial cable connectors;

forming a support from a first portion of the workpiece;

forming a ground clamp from a second portion of the workpiece;

press-fitting a port structure into the support, wherein the port structure includes a plurality of threaded sections for connecting the plurality of coaxial cable connectors onto the port structure; and looping the workpiece around the port structure such that a security wrench is required to tighten the plurality of coaxial cable connectors onto the plurality of threaded sections of the port structure.

14. A method according to claim 13, wherein the workpiece is of stainless steel.

15. A method according to claim 13, wherein the plurality of screw access holes permit a plurality of screws to fasten the ground block onto a structure, one of which screws secures a ground wire in the ground clamp.

* * * * *